March 31, 1970  E. VOGELI  3,503,585
VALVE

Filed April 26, 1968  2 Sheets-Sheet 2

Inventor:
ERNST VOGELI

BY
Kenyon & Kenyon
ATTORNEYS

United States Patent Office 3,503,585
Patented Mar. 31, 1970

1

3,503,585
VALVE
Ernst Vogeli, Wiesendangen, Zurich, Switzerland, assignor to Sulzer Brothers, Ltd., Winterthur, Switzerland, a corporation of Switzerland
Filed Apr. 26, 1968, Ser. No. 724,451
Claims priority, application Switzerland, May 23, 1967, 7,248/67
Int. Cl. F16k 1/12, 47/00
U.S. Cl. 251—121                5 Claims

ABSTRACT OF THE DISCLOSURE

The upper cone surface of the seat zone cooperates with a portion of the valve head of infinite radius of curvature to accelerate the flow while below the external break-off edge the portion of the valve head of diminishing radius of curvature guides the flow from the internal break-off edge towards the conical housing wall to avoid cavitation erosion on the valve head.

---

Figure 1:
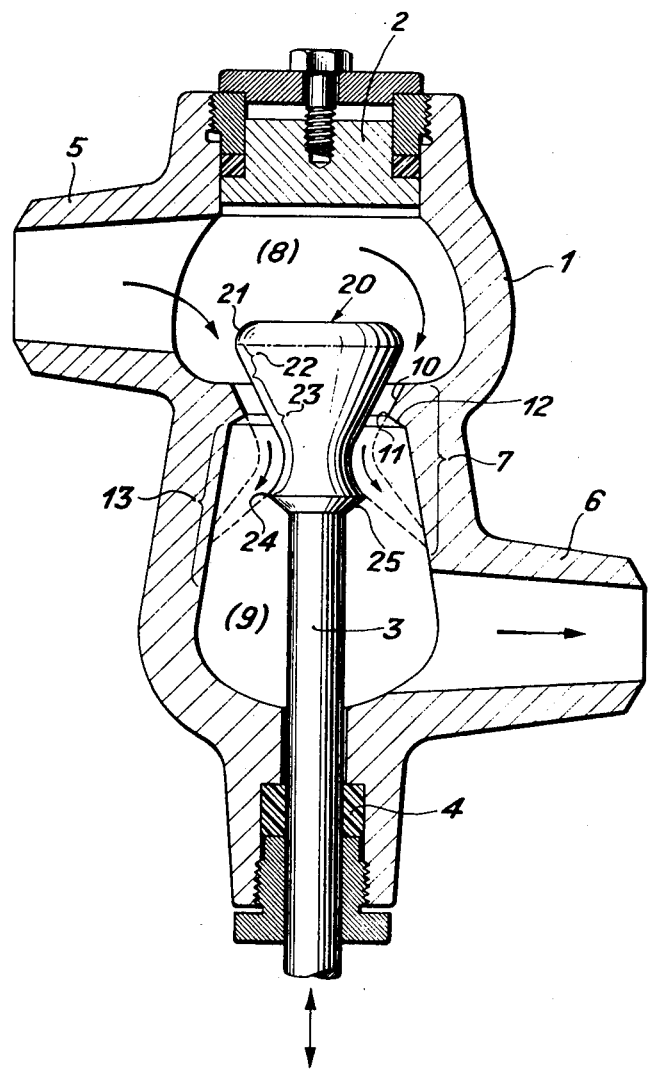

This invention relates to a valve. More particularly, this invention relates to a valve for expanding liquid media.

Valves have been known to be constructed with a valve seat zone having a rotationally symmetrical surface and a rotationally symmetrical valve head which is axially adjustable to the valve heat. In addition, the valve heads have been formed with a conical section which initially diminishes in the flow direction and then increases while the valve seat zones are formed with a conical surface which is shaped to bear nearly or wholly against at least a first potrion of the conically reduced surface of the valve head when the valves are closed. Such a valve is described in U.S. Patent 2,596,368 as a differential pressure relief valve. This valve opens with a first fixedly adjusted pressure in the feed line and closes with a second lower pressure. However, if this valve is used for throttling the flow of a liquid having a temperature near the evaporation point, the valve seat as well as the valve head will be subject to cavitation erosion such that the valve characteristic alters after a short period and the valve becomes leaky.

Accordingly, it is an object of the invention to avoid cavitation on the wall surfaces determining flow rates in valves.

It is another object of the invention to reduce the erosion of the parts of valves.

It is another object of the invention to reduce the flow of a liquid medium through a valve into a thin curtain.

It is another object of the invention to provide a valve for expanding liquid media of a temperature near the evaporation point over large pressure gradients without cavitation erosion occurring on the wall surfaces which determine flow rate and without substantial erosion occurring on other valve parts.

Briefly, the invention provides a valve with a seat zone and a valve head which is axially movable with respect to the seat zone. The seat zone is formed with an initial rotationally symmetrical conical surface, a sharp external break-off annular edge at the downstream end of the conical surface, and an adjoining internal surface which expands conically. The internal surface at first expands at a substantial rate and then at a slight rate. The valve head is formed with a concavely curved generatrix which extends from the lead-in into the actual throttling zone of the valve with a radius of curvature which progresses constantly from an initial infinitely large valve to an internal annular break-off edge, and with a surface which adjoins the internal break-off edge and suddenly diminishes in diameter. The internal break-off edge of the valve head

2 is disposed downstream of the external break-off edge of the seat zone at all times including when the valve is fully opened.

The valve of the invention is constructed on the known principle of avoiding the collapse near a wall of cavitation bubbles formed due to a pressure reduction in the accelerated flow in the feed towards the narrowest cross-section. This is achieved by the invention without difficulty in the portion where the liquid flow is ducted through the seat zone and valve head, that is, above the external break-off edge, by a uniform and undisturbed acceleration of the flow with a resulting uniform reduction of static pressure. The jet of liquid flow downstream of the external break-off edge is then guided only by the valve head. In order to compensate for the delay resulting from friction along the valve head, the liquid jet is accelerated in a continuous outwardly oriented manner with the result that, despite liquid friction, the pressure in the flow does not increase but remains low so that the cavitation bubbles do not collapse.

The diameter of the valve head guide surface for the liquid jet is limited for design reasons and terminates on a break-off edge after which the cavitation bubbles can collapse at some distance from the wall without causing damage.

The liquid jet or flow is reduced into a thin curtain by the thickening of the valve head at the downstream end so that no erosion or only slight insignificant erosion is produced on the valve housing. Further, the thin liquid curtain can be directed onto the valve housing wall to strike the same with a glancing action to obtain more favorable conditions.

It has been found that both break-off edges must be sharply formed to prevent cavitation erosion. Also, the external break-off edge which always bounds the narrowest valve cross-section relative to the exterior is essential as, otherwise, the fluid stratum affected by the curvature cannot form as required.

Figure 2:
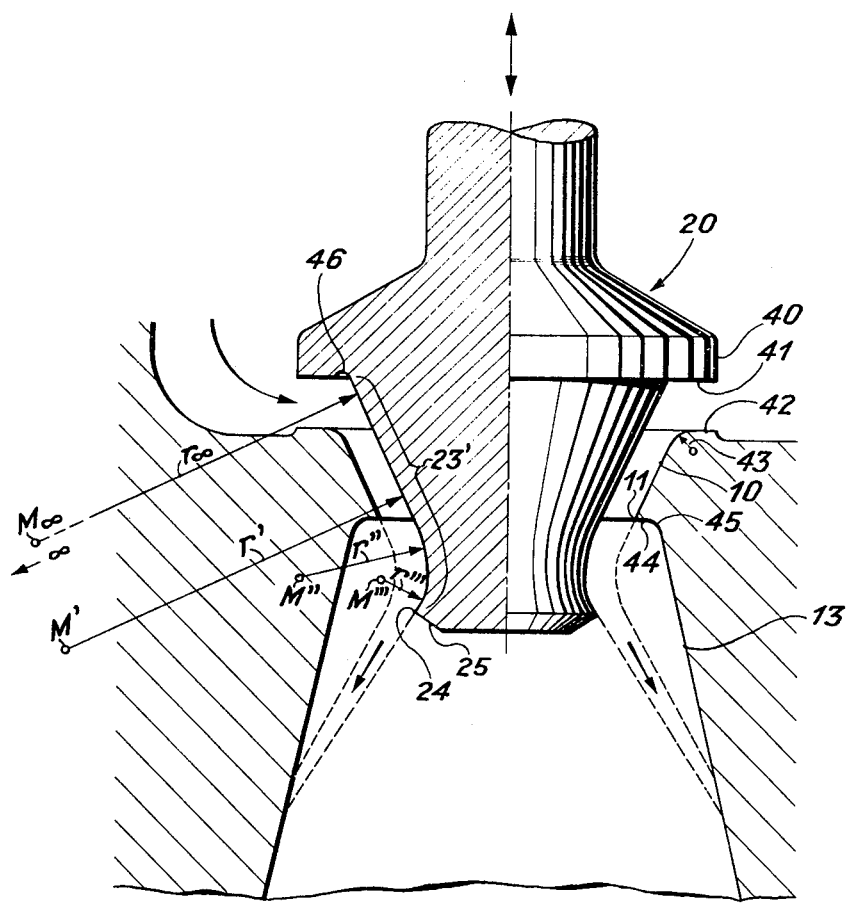

These and other objects and advantages of the invention will become more apparent from the following detailed description and appended claims taken in conjunction with the accompanying drawings in which:

FIG. 1 illustrates a cross-secton view of a valve spindle disposed downstream of the flow; and FIG. 2 illustrates a fragmentary cross-sectional view of a modified valve of the invention with a valve spindle disposed upstream of the flow.

Referring to FIG. 1, a valve housing 1 is closed at the top by a cover 2 and is provided at the bottom with an aperture and gland 4 for a valve spindle 3 as well as on the left-hand side with an inflow socket 5 and on the right-hand side with a discharge socket 6 and is subdivided by a seat zone 7 into an inflow chamber 8 and a discharge chamber 9. The seat zone comprises a cone 10, reducing in section in the flow direction and forming a sealing surface, a break-off edge 11 adjoining the downstream end of the cone 10, a short truncated cone 12 which suddenly expands from the break-off edge 11 and thereafter slowly expands into a long acute-angled cone surface 13.

A valve head 20 on the spindle 3 is disposed within the seat zone and has a rounded entry zone 21, a cone-shaped sealing surface 22 and an adjoining rotationally symmetrical portion 23. The generatrix of the symmetrically rotational portion 23 is concavely curved and at the beginning has the same angle of inclination as the envelope line of the sealing surface 22. The radius of curvature of the generatrix then reduces at a constant rate from an initially infinitely large value to the end formed by an internal annular break-off edge 24. Downstream of the discharge break-off edge 24, the valve head 20 has a truncated cone 25 which converges downwardly and bounds on the spindle 3.

In operation, with the valve open, a flow medium entering through the inflow socket 5 is accelerated along the cone 10 until reaching the break-off edge 11, owing to the reduction of flow cross-section which accompanies the approach to the valve axis. The flow medium then continues to flow along the concave portion 23 of the valve head 20 within a cross-section as indicated by dashed lines in FIG. 1. The flow medium upon reaching the internal break-off edge 24 is then deflected outwardly against the cone surface 13 at an angle as shown. Collapse of the cavitation bubbles against the valve head wall 23 is prevented by the deflection of the flow medium in the outward direction. Collapse of the bubbles takes place only subsequently, in the free flow between the internal break-off edge 24 and the cone surface 13 of the housing wall. The surface of the rotationally symmetrical parts 22, 23 are very accurately machined, since even the slightest irregularities cause a local pressure rise and thus cause collapse of cavitation bubbles. Contour errors must not exceed ±0.2 mm.

Referring to FIG. 2, wherein like reference characters are used to designate like parts as above, the valve head 20 is provided with a radially directed shoulder 40 which has a plane sealing surface 41 at the bottom. The valve seat zone includes a cone 10 which merges with a plane sealing surface 42 corresponding to the sealing surface 41 of the valve head shoulder 40 via a radius 43. In addition, the valve seat zone includes an external break-off edge 11, an adjoining narrow plane surface 44 corresponding to the cone 12 of FIG. 1 which is joined via a radius 45 to the cone surface 13 of the housing wall. When the valve is in the closed position, sealing is obtained between the plane surfaces 41, 42 while a slight gap remains between the cone 10 and the curved surface 23' of the valve head 20. The generatrix of the curved surface 23' is diagrammatically indicated by the various radii of curvature which diminish along the length of the surface 23' with the center $M_\infty$ being at infinity.

A shallow concave fillet 46 between the sealing surface 41 and the curved surface 23' serves to facilitate machining of the sealing surface 41. This has been proved to be without disadvantage since it is disposed on the inlet side of the narrowest cross-section in the zone of flow velocities which are still low. However, the fillet 46 can be omitted.

What is claimed is:
1. A valve comprising
a valve housing having a valve seat zone therein, said seat zone including a first cone surface, an annular external break-off edge at the downstream end of said first cone surface, a surface of suddenly expanding diameter adjoining said edge, and a second cone surface of expanding diameter adjoining downstream of said suddenly expanding surface; and
a valve head slidably mounted in said housing concentrically of said valve seat zone, said valve head having a concavely curved generatrix portion with a radius of curvature reducing at a constant rate from an infinite value at one end adjacent said first cone surface of said valve seat zone to an annular internal break-off edge disposed below said external break-off edge, and a truncated cone surface adjoining said internal break-off edge of diminishing diameter whereby said generatrix portion directs a flow medium outwardly from said internal break-off edge towards said second cone surface.

2. A valve as set forth in claim 1 wherein the radius of curvature of said generatrix portion progressively diminishes from entry into a throttling zone adjacent said portion to said internal break-off edge.

3. A valve as set forth in claim 1 wherein said suddenly expanding surface is a cone.

4. A valve as set forth in claim 1 wherein said valve seat zone has a plane sealing surface at the upstream end thereof and said valve head has a radially directed shoulder including a plane sealing surface thereon opposite said sealing surface of said seat zone for sealing therewith upon closing of the valve.

5. A valve as set forth in claim 1 wherein said internal break-off edge is concentrically within said external break-off edge.

References Cited
UNITED STATES PATENTS

| 2,393,442 | 1/1946 | Yellott et al. | 251—121 |
| 2,596,368 | 5/1952 | Brunton | 137—470 |
| 3,080,885 | 3/1963 | Webster et al. | 251—205 XR |

HENRY T. KLINKSIEK, Primary Examiner

U.S. Cl. X.R.

251—205